United States Patent
Fukushima et al.

(10) Patent No.: US 6,786,713 B2
(45) Date of Patent: Sep. 7, 2004

(54) HONEYCOMB STRUCTURE MOLDING DIE HAVING NARROW SLIT GROOVES WITH RECESSES AND PROTRUSIONS

(75) Inventors: Takeshi Fukushima, Hekinan (JP); Akira Sasaki, Takahama (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 10/132,449

(22) Filed: Apr. 26, 2002

(65) Prior Publication Data

US 2002/0160073 A1 Oct. 31, 2002

(30) Foreign Application Priority Data

Apr. 27, 2001 (JP) ........................................ 2001-133132

(51) Int. Cl.[7] .............................................. B29C 47/12

(52) U.S. Cl. ................... 425/380; 425/382 R; 425/467; 264/177.12; 264/400; 264/630

(58) Field of Search ............................ 425/380, 382 R, 425/467; 264/177.12, 630, 400

(56) References Cited

U.S. PATENT DOCUMENTS 4,883,420 A * 11/1989 Ozaki et al. ................. 425/464
6,376,799 B1 * 4/2002 Amako et al. .......... 219/121.77

FOREIGN PATENT DOCUMENTS

JP 7-80977 3/1995
JP 11-780 1/1999

* cited by examiner

*Primary Examiner*—Robert Davis
*Assistant Examiner*—Joseph S Del Sole
(74) *Attorney, Agent, or Firm*—Nixon & Vanderhye P.C.

(57) ABSTRACT

A honeycomb structure molding die that can mold a thin-walled honeycomb structure without degrading the moldability has been provided. A honeycomb structure molding die 8 comprises at least supply holes 81 to supply materials and slit grooves 82 that are communicated with the supply holes 81 and mold the materials into a honeycomb shape, wherein the groove width of the slit grooves 82 is not more than 100 $\mu$m and simultaneously, recesses 41 and protrusions 42 that extend in the direction in which the materials are extruded are provided on a pair of opposing side surfaces 820 of the slit grooves 82.

6 Claims, 6 Drawing Sheets

HONEYCOMB STRUCTURE MOLDING DIE HAVING NARROW SLIT GROOVES WITH RECESSES AND PROTRUSIONS

BACKGROUND OF THE INVENTION

1. Field of the Invention

The present invention relates to a molding die used to extrude a thin-walled honeycomb structure.

2. Description of the Related Art

A ceramic honeycomb structure, for example, one of the main components of which is cordierite, is manufactured by extruding materials using a molding die. The honeycomb structure comprises many cells formed by partition walls provided in a grid pattern, and the shape of the cell can be, for example, quadrangular and hexagonal.

As the above-mentioned honeycomb structure molding die, one is used that comprises supply holes through which materials are supplied and slit grooves that are communicated with the supply holes and mold the materials into the above-mentioned honeycomb shape.

Recently, the partition wall of the honeycomb structure has been required to be thinner, for example, not more than 150 $\mu$m or 100 $\mu$m. In accordance with this demand, naturally the groove width of the slit grooves of the honeycomb structure molding die is also required to be narrower.

If, however, the groove width of the slit grooves of the honeycomb structure molding die is narrowed, the flow of the materials, which are supplied through the supply holes, is obstructed when passing through the slit grooves. Therefore, the molding pressure during molding increases and the moldability may be degraded.

SUMMARY OF THE INVENTION

The present invention has been developed with these conventional problems being taken into account, and the object is to provide a honeycomb structure molding die that can mold a thin-walled honeycomb structure without degrading the moldability.

In the first aspect of the present invention, a honeycomb structure molding die is provided, which comprises at least supply holes to supply materials and slit grooves that are communicated with the supply holes and mold the materials into a honeycomb shape, wherein the groove width of the slit grooves is not more than 100 $\mu$m and at the same time, a pair of opposing side surfaces of the slit grooves have recesses and protrusions extending in the direction in which the materials are extruded, respectively.

The honeycomb structure molding die of the present invention has, as described above, very narrow slit grooves, the groove width of which is not more than 100 $\mu$m. Therefore, when the honeycomb structure molding die is used for extrusion, the flowability of the materials is degraded and concern over the increase of the extrusion pressure may arise.

In the present invention, the recesses and protrusions are provided on the side surface of the slit grooves, as described above. They extend in the direction in which materials are extruded during extrusion. Therefore, when the materials flow, the recesses and protrusions play a role in guiding the materials to flow in a desired direction. In this manner, the flowability of the materials during extrusion can be improved, the fluidity of the materials can be maintained high and the increase of the molding pressure can be suppressed even when the groove width of the slit grooves is as narrow as 100 $\mu$m or less.

As a result, according to the honeycomb structure molding die of the present invention, a thin-walled honeycomb structure can be molded without degrading the moldability.

In the second aspect of the present invention, a honeycomb structure molding die is provided, which comprises at least supply holes to supply materials and slit grooves that are communicated with the supply holes and mold the materials into a honeycomb shape, wherein the groove width of the slit grooves is not more than 100 $\mu$m and, at the same time, the pitch P1 of the protrusions, which is obtained by measuring the surface roughness in the direction in which the materials are extruded, and the pitch P2 of the protrusions, which is obtained by measuring the surface roughness in the direction perpendicular to that in which the materials are extruded, satisfy the relationship P1/P2>1.5, on a pair of opposing side surfaces of the slit grooves.

In the present invention, the surface roughness of the side surface of the slit grooves in the direction in which the materials are extruded differs from that in the perpendicular direction, as described above. In addition, the pitch P1 of protrusions in the direction in which the materials are extruded and the pitch P2 of protrusions in the perpendicular direction satisfy the relationship P1/P2>1.5, that is, the pitch P2 is longer than the pitch P1, as described above.

Having such surface roughness enables the side surfaces of the slit grooves to maintain a state in which proper recesses and protrusions are formed in the direction in which the materials are extruded. Therefore, the surface roughness of the side surfaces plays a role in guiding the flow of the materials when the molding materials are extruded.

In this manner, the flowability of the materials during extrusion can be improved, therefore, the fluidity of the materials can be maintained high and an increase in the molding pressure can be suppressed even when the groove width of the slit grooves is as narrow as 100 $\mu$m or less.

As a result, according to the honeycomb structure molding die of the present invention also, a thin-walled honeycomb structure can be molded without degrading the moldability.

It is preferable, in the present invention, that the pitch of the recesses is 180 $\mu$m to 200 $\mu$m. If the pitch of the recesses (pitch of the protrusions) is less than 150 $\mu$m or the pitch of the recesses exceeds 220 $\mu$m, a problem that the effect to guide the materials to flow in a desired direction is decreased is caused, in each case.

It is also preferable that the depth of the recesses or the height of the protrusions is 6 $\mu$m to 12 $\mu$m. If the depth of the recesses or the height of the protrusions is less than 4 $\mu$m, the effect to guide the materials that pass through the slit grooves to flow in a desired direction is excessively decreased. On the other hand, if it exceeds 14 $\mu$m, the effect to guide the materials to flow in a desired direction is excessively increased and there appears a possibility that most of the materials may only pass through a limited area.

On the other hand, it is preferable that not less than 50% of the protrusions on one side of the opposing side surfaces oppose the protrusions on the other side thereof. Thus, the effect to guide the materials to flow in a desired direction can be fully realized. When less than 50%, the effect due to the construction in which the protrusions on one side surface oppose those on the other side surface cannot be properly achieved.

It is also preferable that the recesses and the protrusions are constructed by randomly arranging unit recesses and unit protrusions, the dimensions of which are shorter than the groove depth of the slit grooves. In this case, the materials can easily shift transversely from the unit recess or the unit protrusion to the next unit recess or the unit protrusion when the materials are moved in the extruding direction, and the pressure increase in the transverse direction by flow obstruction can be easily prevented.

It is preferable here that the length of the unit recess and the unit protrusion is 13 µm to 18 µm. If the length is within this range, it is possible to form them by using a laser machining method, which will be described later, and adjusting the pulse width of the laser beam.

In addition, it is possible to set the groove depth of the slit grooves to not less than ten times the groove width. In this case, the slope of the angular portion works effectively to prevent the obstruction of the flow of the molding materials.

The present invention may be more fully understood from the description of the preferred embodiments of the invention set forth below, together with the accompanying drawings.

DESCRIPTION OF THE PREFERRED EMBODIMENTS

The embodiments of the present invention are described with reference to FIG. 1 to FIG. 8.

Figure 1A:
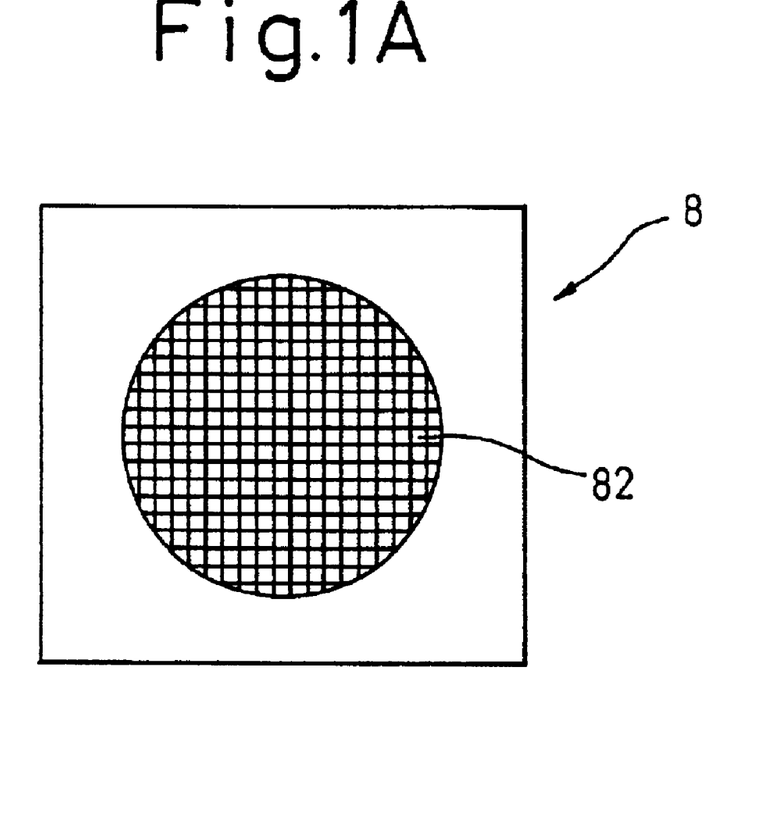
FIG. 1A is a plane view of a honeycomb structure molding die in an embodiment.
Figure 1B:
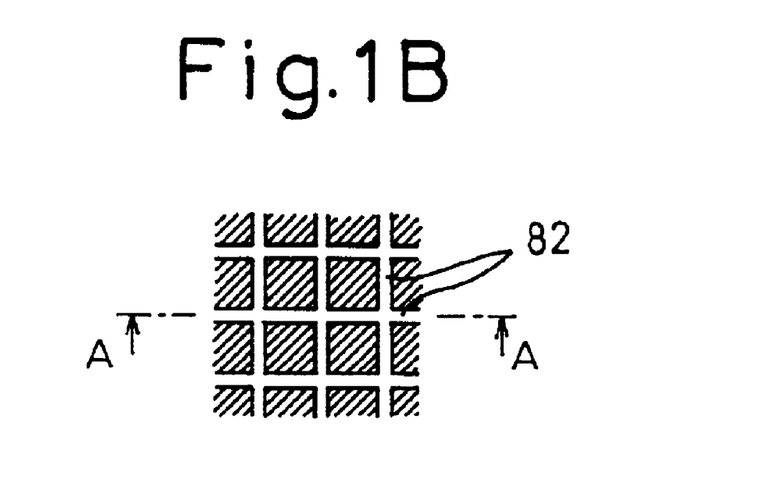
FIG. 1B is an enlarged view of the major components of the honeycomb structure molding die.
Figure 2A:
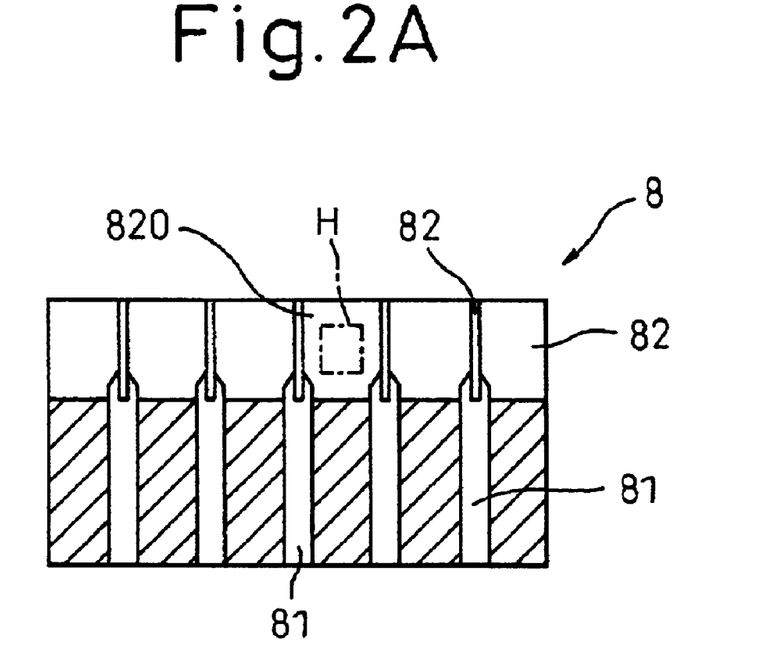
FIG. 2A is a section view, taken along line A—A shown in FIG. 1, of the honeycomb structure molding die in the embodiment.
Figure 2B:
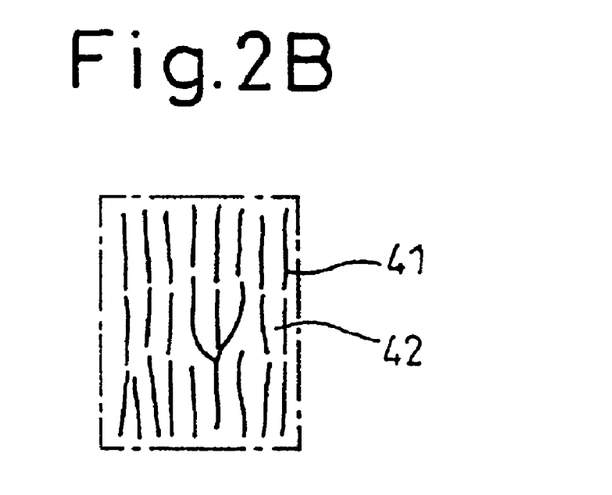
FIG. 2B is an enlarged exemplary view of H portion of the honeycomb structure molding die.

A honeycomb structure molding die 8 in the present embodiment comprises at least supply holes 81 to supply materials therethrough and slit grooves 82 that are communicated with the supply holes 81 and mold the materials into a honeycomb shape, as shown in FIG. 1 and FIG. 2.

In the honeycomb structure molding die 8 of the present embodiment, the groove width of the slit grooves 82 is not more than 100 µm and at the same time, recesses 41 and protrusions 42 that extend in the direction in which the materials are extruded are provided, respectively, on a pair of opposing side surfaces 820 of the slit grooves 82.

Various configurations are possible for the recesses 41 and the protrusions 42, and one of them is exemplarily shown in FIG. 2B.

The honeycomb structure molding die 8 in the present embodiment can be used when a honeycomb structure is extruded using the ceramic materials obtained by kneading plural powders and binders, which are the raw materials of cordierite. At this time, the raw material powders, the grain diameter of which is not more than 60 µm, can be adopted.

Figure 3:
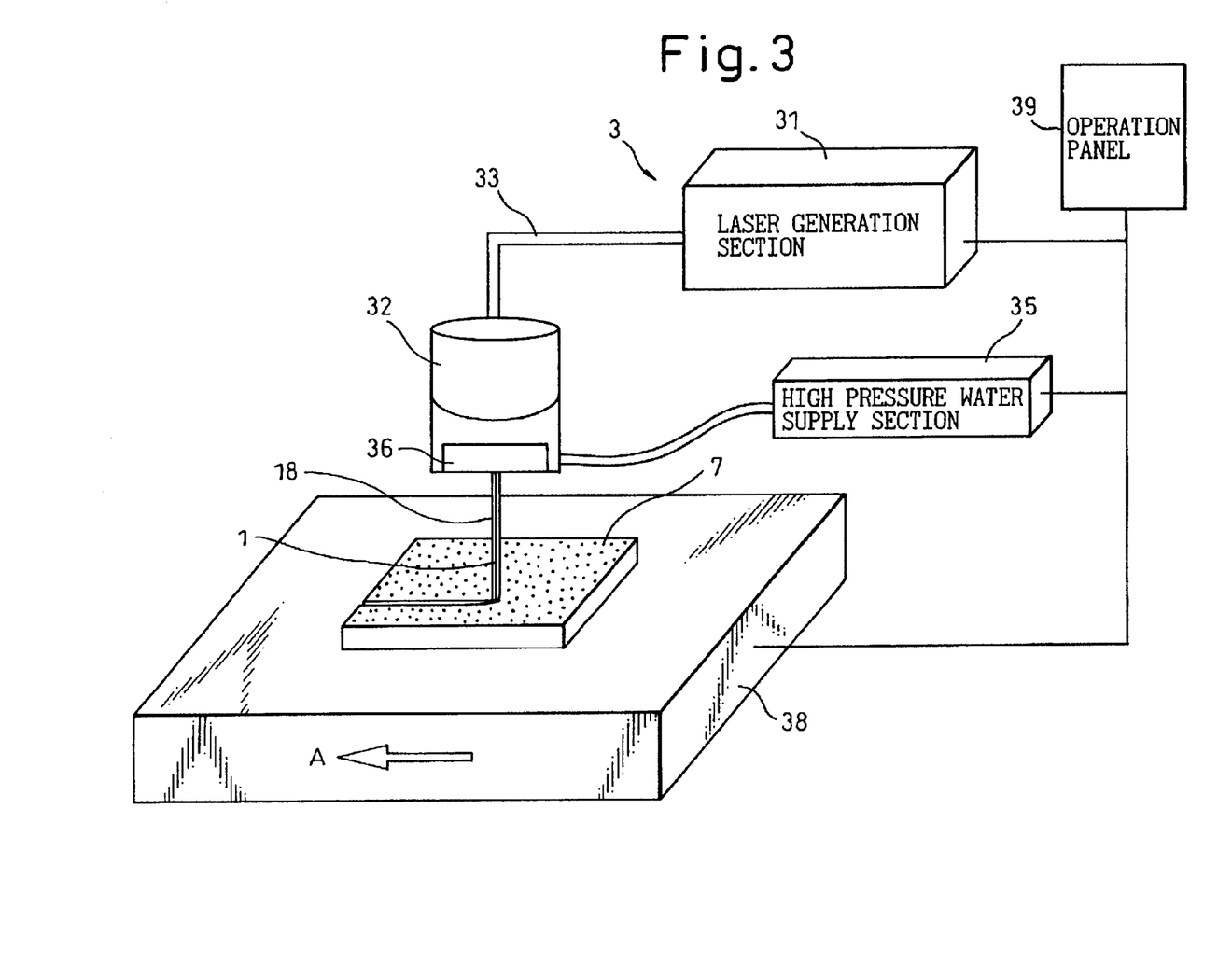
FIG. 3 is an illustrative drawing that illustrates the structure of a laser machining device in an embodiment.

In order to manufacture the honeycomb structure molding die 8, a laser machining device 3 shown in FIG. 3 is used. The laser machining device 3 comprises a laser light generating section 31 to generate a laser beam, a laser head 32 to narrow the diameter of the generated laser beam to a desired diameter, an optical fiber section 33 that connects therebetween and guides the laser beam, a high pressure water supply section 35 that supplies high pressure water to be used to form a water column 18, which is injected around a laser beam 1, to the laser head 32, and a nozzle 36 that injects the high pressure water as the water column 18.

The laser machining device 3 also comprises a bed 38 that not only holds a die material 7 but also can move it horizontally in a plane. A bed drive section built in the bed 38, the high pressure water supply section 35, and the laser generation section 31 are connected to an operation panel 39 to operate these sections.

The die material 7 is a rectangular metal plate, having a thickness of 15 mm, a width of 200 mm, and a length of 200 mm and the material being a steel (JIS SKD61). It is needless to say that a die material different from this in size and material can be also used.

In the present embodiment, slit grooves, which have a width of 0.1 mm and a depth of 2.0 mm, are formed in the die material 7. In addition, the supply holes 81 were provided in advance by a drill before the slit grooves 82 are machined in the present embodiment.

Then, the die material 7 is held movably in a plane by a holding device, which is not shown. While the die material 7 is being moved in the direction of arrow A shown in FIG. 3, water is injected from the laser machining device 3 to a groove forming location in the groove forming plane of the die material 7 to form the water column 18 and simultaneously the laser beam 1 is irradiated through the water column 18. Moreover, irradiation scanning is performed by moving the irradiation point of the laser beam 1 along the groove forming location and passing the beam 1 through the same groove forming location several times.

The moving speed of the die material 7 is set to 150 mm/min to 240 mm/min.

Moreover, the irradiation of the laser beam 1 is performed with fixed pulses, that is, performed intermittently. In this manner, by combining the irradiation scanning and the pulse irradiation of the laser beam, a groove is formed as if it were formed with small holes being shifted successively little by little.

Figure 4:
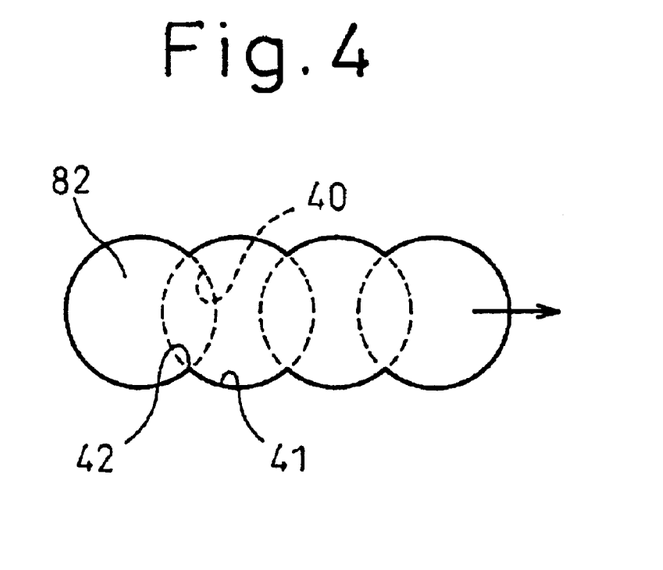
FIG. 4 is an illustrative drawing that illustrates the slit groove forming process in an embodiment.

In concrete terms, a groove which is formed by arranging circular holes 40 being overlapped in a row, as shown by the model in FIG. 4, is formed. As a result, intersections of the outer peripheries of the circular holes 40 form the protrusions 42 on the side wall and the recesses 41 exist between the protrusions 42.

Figure 5:
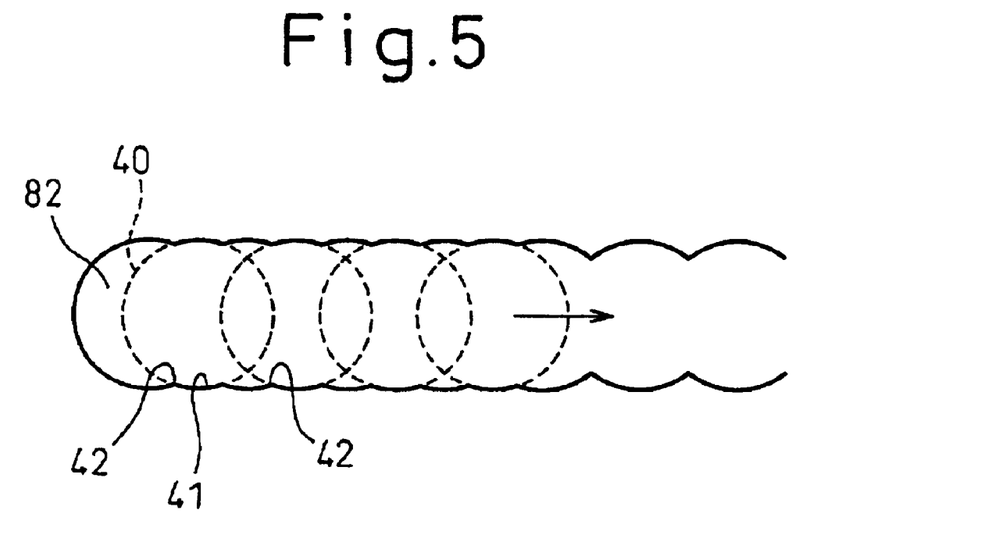
FIG. 5 is an illustrative drawing that illustrates the slit groove forming process in the embodiment.

When the irradiation scanning is further repeated, the circular holes overlap each other more densely, as shown in FIG. 5, and as the number of the protrusions 42 and the recessed 41 increases, the height of the protrusion from the recess decreases properly.

Since each circular hole 40 is not necessarily complete circle actually, the positions where the recesses and the protrusions are formed are not regular and their sizes vary, that is, are random to a certain extent.

On the other hand, the depth of the slit grooves 82 is gradually increased by an amount corresponding to the depth of the circular hole 40 because of the repetition of the irradiation scanning. Therefore, the recesses 41 and the protrusions 42 are formed in such a manner that the recess (unit recess) 41 and the protrusion (unit protrusion) 42 having the unit length equal to the length of the circular hole 40 are piled several times corresponding to times of the irradiation scanning, and a state is established in which each of the recesses 41 and the protrusions 42 is arranged randomly, extending in the direction in which the materials are extruded. When each of the recesses 41 and the protrusions 42 is observed in the direction in which the materials are extruded, it seems to branch and meet several times, and meander as shown in FIG. 2B, for example.

Moreover, as the above-mentioned groove forming method has been employed, almost all or at least not less than 50% of the recesses 41 (and the protrusions 42), on one side of the opposing side surfaces 820, are formed in such a way as to oppose those on the other side thereof.

In the present embodiment, the irradiation scanning was repeated 150 times so that the laser beam passed through all the groove forming locations without partiality. In this manner, the narrow and deep slit grooves 82 having a width of 0.1 mm (100 μm) and a depth of 2.0 mm were obtained.

The function and effects of the present embodiment are described below.

The honeycomb structure molding die 8 in the present embodiment has the very narrow slit grooves 82, the groove width of which is not more than 100 μm, as described above. Therefore, when the honeycomb structure molding die 8 is used for extrusion, the flowability of the materials is degraded and a concern about an increase in the extrusion pressure may arise.

In the present embodiment, however, the recesses 41 and the protrusions 42 are provided on the side surface 820 of the slit grooves 82, as described above. They extend in the direction in which the materials are extruded during extrusion. Therefore, when the materials flow, the recesses 41 and protrusions 42 play a role to guide the materials to flow in a desired direction. In this manner, the flowability of the materials during extrusion can be improved, the fluidity of the materials can be maintained high and an increase in the molding pressure can be suppressed even when the groove width of the slit grooves 82 is as narrow as 100 μm or less.

Particularly in the present embodiment, in the arrangement of the recesses 41 and the protrusions 42 the unit recesses and unit protrusions are randomly arranged and they branch and meet several times and meander, when observed in the direction in which the materials are extruded, as described above. Therefore, the ceramic materials to be extruded are moved forward smoothly while being moved properly in the transverse direction to mix with each other and are guided in the extruding direction by the recesses 41 and the protrusions 42. Therefore, the fluidity of the materials is improved and an increase of the molding pressure can be suppressed.

Moreover, in the present embodiment, the surface roughness of the side surfaces 820 of the slit grooves 82 of the honeycomb structure molding die 8 has been measured and considered.

Figure 6:
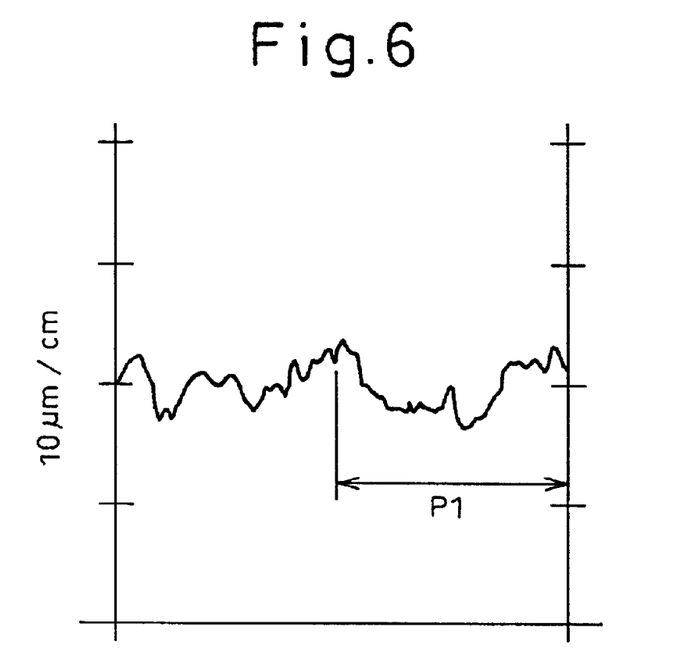
FIG. 6 is an illustrative drawing that illustrates the measurement results of the surface roughness, measured in the direction in which materials are extruded, of the side surface of the slit grooves, in an embodiment.
Figure 7:
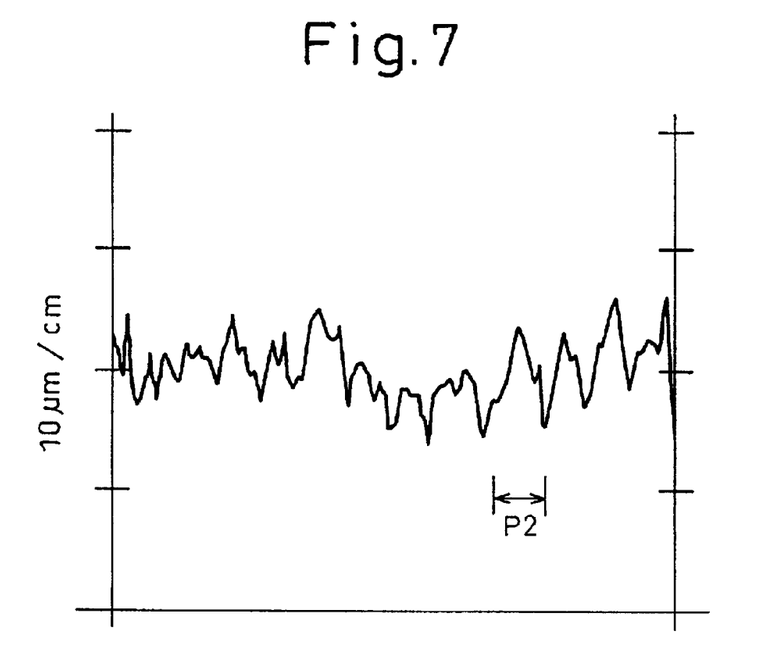
FIG. 7 is an illustrative drawing that illustrates the measurement results of the surface roughness, measured in the direction perpendicular to that in which materials are extruded, of the side surface of the slit grooves, in the embodiment.

FIG. 6 shows the surface roughness data of the side surfaces 820 of the slit grooves 82 obtained from the measurement in the direction in which the materials are extruded. FIG. 7 shows the surface roughness data of the side surfaces 820 obtained from the measurement in the direction perpendicular to that in which the materials are extruded.

As can be from these figures, the pitch P1 of the protrusions (recesses) when the surface roughness was measured in the direction in which the materials were extruded was about 400 μm. On the other hand, the pitch P2 of the protrusions (recesses) when the surface roughness was measured in the direction perpendicular to that in which the materials were extruded was about 200 μm. That is, the ratio of P1 to P2 (P1/P2), was about 2.

In addition, as shown in FIG. 7, the pitch of the recesses 42 (protrusions 41) was about 200 μm and the depth of the recesses 42, that is, the height of the protrusions 41, was about 7 μm.

As described above, it can be said that recesses and protrusions are adequately formed, in the direction in which the materials are extruded, on the side surfaces of the slit grooves 82, as long as the relationship between P1 and P2 at least satisfies the condition that P1 is about twice as large as P2 (more than 1.5 times). Therefore, it is thought that the surface roughness on the side surfaces 820 described above is effective when extruding the molding materials.

Figure 8A:
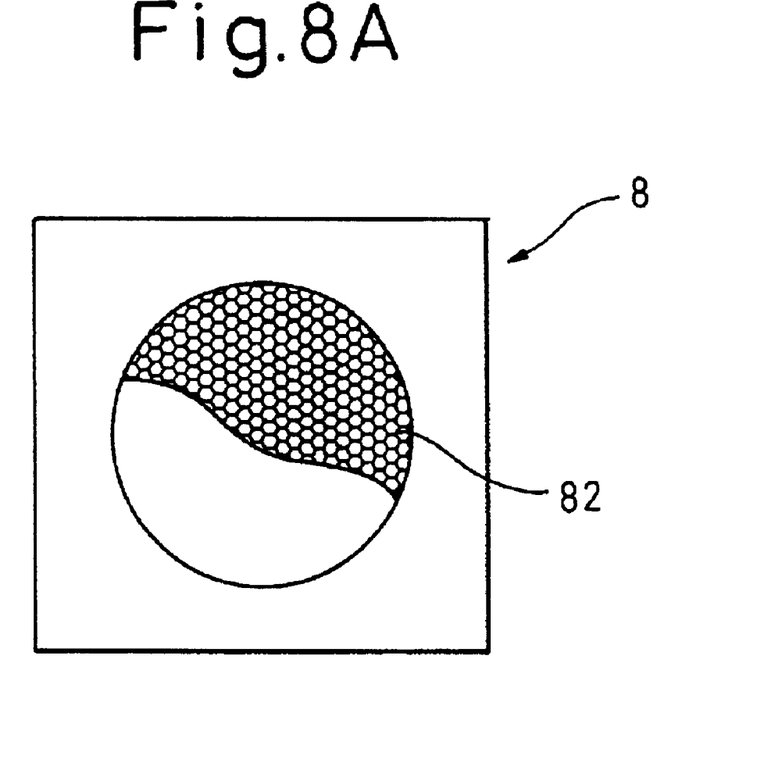
FIG. 8A is a plan view that shows another example of the shape of an honeycomb structure molding die in an embodiment.
Figure 8B:
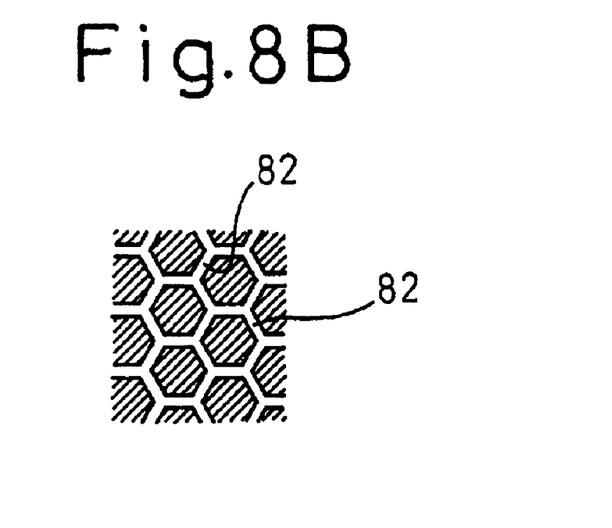
FIG. 8B is an enlarged view of the major components of the honeycomb structure molding die.

Although a case where the grid, which is formed by the vertical and horizontal slit grooves 82, as shown in FIG. 1B, and forms the honeycomb structure molding die 8, is rectangular is shown in the above embodiments, the grid formed by the slit grooves 82 can be hexagonal as shown in FIG. 8, and the same effects can be achieved in this case.

While the invention has been described by reference to specific embodiments chosen for the purposes of illustration, it should be apparent that numerous modifications could be made thereto by those skilled in the art without departing from the basic concept and scope of the invention.

What is claimed is:

1. A honeycomb structure molding die, comprising at least supply holes to supply materials and slit grooves that are communicated with the supply holes and mold the materials into a honeycomb shape,
   wherein the groove width of the slit grooves is not more than 100 μm and simultaneously, recesses and protrusions that extend in the direction in which the materials are extruded are provided on a pair of opposing side surfaces of the slit grooves, respectively.

2. A honeycomb structure molding die, as set forth in claim 1, wherein the pitch of the recesses is 150 μm to 220 μm.

3. A honeycomb structure molding die, as set forth in claim 1, wherein the depth of the recesses or the height of the protrusions is 5 μm to 13 μm.

4. A honeycomb structure molding die, as set forth in claim 1, wherein 50% or more of the protrusions on one side of the opposing side surfaces oppose the protrusions on the other side thereof.

5. A honeycomb structure molding die, as set forth in claim 1, wherein the recesses and the protrusions are composed of unit recesses and unit protrusions the dimension of which is shorter than the groove depth of the slit grooves, and are arranged randomly.

6. A honeycomb structure molding die, comprising at least supply holes to supply materials and slit grooves that are communicated with the supply holes and mold the materials into a honeycomb shape, wherein the groove width of the slit grooves is not more than 100 $\mu$m and simultaneously, pitch P1 of protrusions, which is obtained by measuring the surface roughness in the direction in which the materials are extruded, and pitch P2 of protrusions, which is obtained by measuring the surface roughness in the direction perpendicular to that in which the materials are extruded, satisfy the relationship P1/P2>1.5, on a pair of opposing side surfaces of the slit grooves.

* * * * *